United States Patent [19]
Bronicki et al.

[11] Patent Number: 5,839,282
[45] Date of Patent: Nov. 24, 1998

[54] METHOD AND MEANS FOR USING A TWO PHASE FLUID

[75] Inventors: Lucien Y. Bronicki, Yavne; Nadav Amir, Rehovot; Alex Moritz, Holan; Asher Elovic, Rishon Lezion, all of Israel

[73] Assignee: Ormai Industries Ltd., Yavine

[21] Appl. No.: 886,172

[22] Filed: Jun. 30, 1997

Related U.S. Application Data

[62] Division of Ser. No. 422,656, Apr. 14, 1995, Pat. No. 5,660,042, which is a continuation of Ser. No. 952,156, Sep. 28, 1992, abandoned, which is a continuation of Ser. No. 658,303, Feb. 20, 1991, abandoned.

[51] Int. Cl.$^6$ .................................................. F06G 7/00
[52] U.S. Cl. ........................... 60/641.5; 60/641.2; 60/655; 60/676; 60/718
[58] Field of Search ................................ 60/641.2, 641.5, 60/641.3, 651, 655, 660, 671, 676, 691, 693, 711, 718; 290/40 B Primary Examiner—Noah P. Kamen
Attorney, Agent, or Firm—Donald M. Sandler

[57] ABSTRACT

A method for using a two-phase fluid includes separating the fluid into its two phases, one of which is a hot gas containing energy in the form of latent heat, and one of which is a hot liquid containing energy in the form of sensible heat; converting sensible heat in the liquid to sensible heat in a working fluid for producing preheated working fluid; and transferring latent heat in the gas to the preheated working fluid for vaporizing the same at substantially constant temperature and pressure.

7 Claims, 4 Drawing Sheets

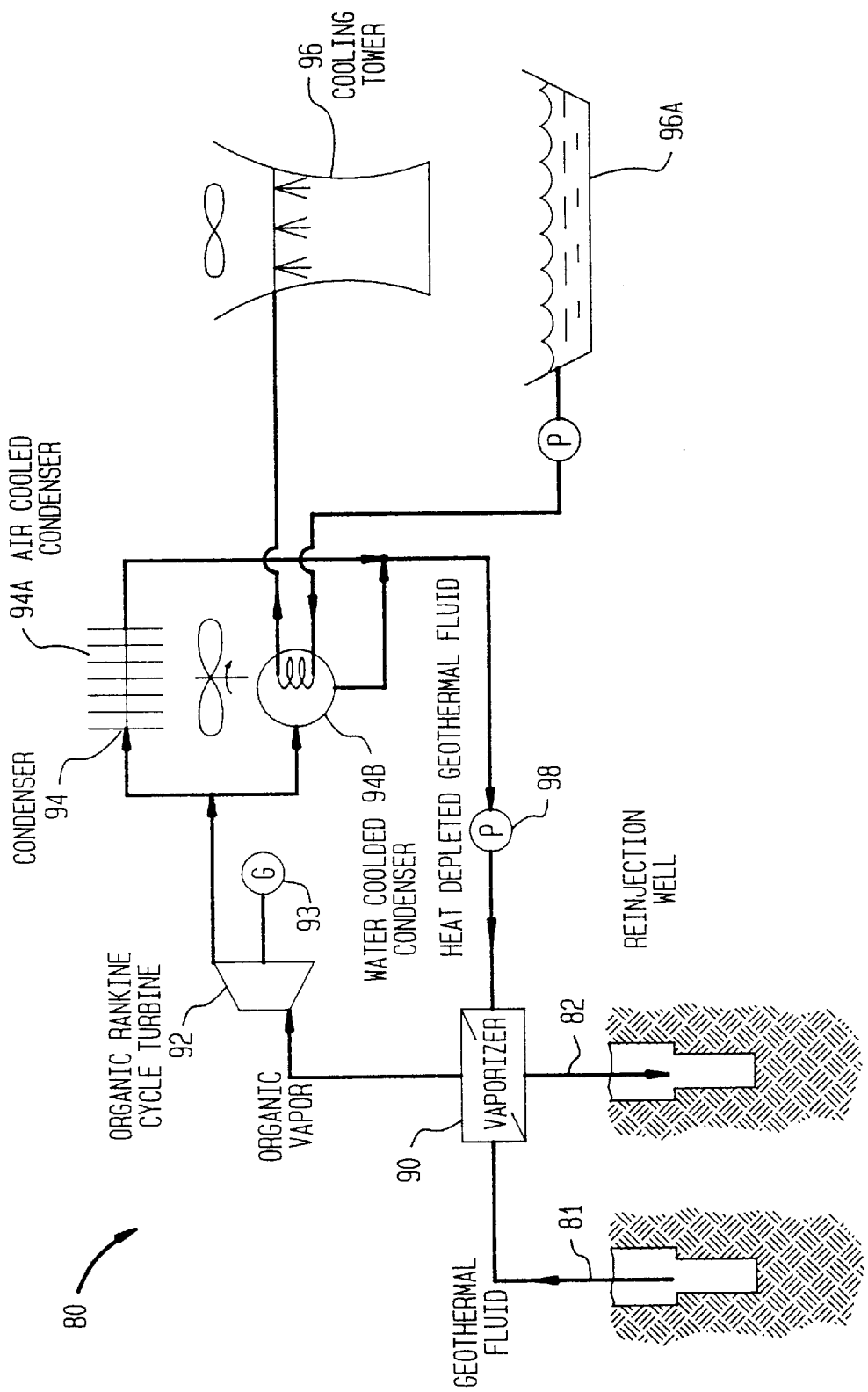

METHOD AND MEANS FOR USING A TWO PHASE FLUID

This application is a divisional of Ser. No. 08/422,656, filed Apr. 14, 1995, now U.S. Pat. No. 5,660,042, which is a continuation of Ser. No. 07/952,156, filed Sep. 28, 1992, abandoned, which is a continuation of Ser. No. 07/658,303, filed Feb. 20, 1991, abandoned.

RELATED SUBJECT MATTER

This application is related to the following copending applications, the disclosures of which are hereby incorporated by reference:

Application Ser. No. 07/444,565 filed Dec. 1, 1989, abandoned;

Application Ser. No. 07/622,341 filed Nov. 29, 1990; now U.S. Pat. No. 5,038,567; and Application Ser. No. 07/656,879 filed Feb. 19, 1991, abandoned.

TECHNICAL FIELD

This invention relates to a method of and means for using a two-phase fluid for generating power in a Rankine cycle power plant, and more particularly, for using a two-phase fluid such as geothermal fluid extracted from a water dominated geothermal source.

BACKGROUND ART

Some two-phase fluids, such as fluids obtained from water dominated geothermal sources such as occur naturally in many areas of the world, contain a considerable amount of heat that can be utilized for power production using a Rankine cycle power plant. Because of the corrosive properties of such geothermal fluid, and engineering difficulties in designing heat engines to operate efficiently with a two-phase working fluid, it is conventional to separate the water and steam at the wellhead, and to utilize the two fluids in separate power plants. The steam may be used, either directly in a conventional steam turbine, or indirectly as the heat source for an organic working fluid Rankine cycle power plant such as shown in U.S. Pat. No. 4,542,625, the disclosure which is hereby incorporated by reference. Such an organic, Rankine cycle power plant comprises a vaporizer containing an organic fluid, such as a Freon, hydrocarbon, etc., which is vaporized by the application of the geothermal steam to the vaporizer. The resultant heat-depleted steam (condensate) at the outlet of the vaporizer is then disposed of, possibly by injection into what is termed a rejection well. Vaporized working fluid produced by the vaporizer is applied to a specially designed turbine which converts some of the heat in the working fluid to useful work and produces heat-depleted working fluid that is supplied to either a water, or an air cooled condenser wherein the heat-depleted working fluid is condensed into a liquid condensate that is returned to the vaporizer.

To increase the utilization of the heat contained in geothermal fluid, it is also conventional to use the liquid separated from the steam for generating power. To this end, it is conventional to apply the hot geothermal water to another organic Rankine cycle power plant such as shown in U.S. Pat. No. 4,578,953, the disclosure of which is hereby incorporated by reference. The '953 patent discloses a cascade arrangement of vaporizers, each associated with its own turbine, and arranged so that the hot geothermal water passes serially from vaporizer to vaporizer. Improved thermodynamic efficiency is achieved by employing a preheater for each vaporizer and applying the heat-depleted geothermal water from the last stage of the cascade to all the preheaters in parallel, thereby preheating the working fluid in each stage before the working fluid enters the vaporizer of the stage.

In some situations, it is impractical to provide separate power plants, one utilizing geothermal steam, and the other utilizing geothermal water. Furthermore, the thermodynamic efficiency of a power plant operating on geothermal water may be too low to warrant the capital cost of the equipment.

It is therefore an object of the present invention to provide a new and improved method of and means for increasing the thermodynamic efficiency of a power plant operating with a two-phase fluid such as fluid obtained from a water dominated geothermal source.

It is a further object of the present invention to provide a new and improved method of and means for increasing the efficiency and/or the thermodynamic efficiency of a power plant operating with a fluid obtained from a geothermal source.

DISCLOSURE OF THE INVENTION

The present invention provides a method for using a two-phase fluid comprising the steps of separating the fluid into its two phases, one of which is a hot gas containing energy in the form of latent heat, and one of which is a hot liquid containing energy in the form of sensible heat; converting sensible heat in the liquid to sensible heat in a working fluid for producing preheated working fluid; and transferring latent heat in the gas to the preheated working fluid for vaporizing the same at substantially constant temperature and pressure.

The two-phase fluid may be a water dominated geothermal fluid, one phase of which is hot water, and the other phase of which is steam. Preferably, the working fluid may be an organic fluid. In such case, the invention provides for expanding the vaporized working fluid in a heat engine to obtain work and heat-depleted working fluid, condensing the heat-depleted working fluid to produce condensed working fluid. In a broad aspect, the invention uses a two-phase fluid in a Rankine cycle power plant of the type having a vaporizer for vaporizing a working fluid, a heat engine responsive to vaporized working fluid for producing work and heat-depleted working fluid, and a condenser for condensing the heat-depleted working fluid and producing condensate that is returned to the vaporizer. The method according to the present invention includes the steps of separating the two-phase fluid into its two phases, one of which is a hot gas, and one of which is a hot liquid, passing said gas through the vaporizer wherein heat from the gas vaporizes working fluid in the vaporizer, and passing said liquid through a preheater interposed between the condenser and the vaporizer, heat from the liquid serving to preheat the condensate before it is returned to the vaporizer.

The present invention is operable with geothermal fluid extracted from a water dominated geothermal source, both the geothermal water and the geothermal steam being utilized in a single power plant rather than in separate plants. Thus, in the invention, the geothermal water preheats the working fluid before it is supplied to the vaporizer of the power plant and raises the temperature of the working fluid from the condenser temperature to a temperature just below the temperature of the vaporizer, and the geothermal steam heats the working fluid in the vaporizer under conditions of constant temperature and pressure. The available heat in the geothermal fluid, when utilized under these conditions, is more advantageously used than is the case were the geothermal steam applied to a power plant separate from the power plant to which the geothermal water is applied.

In addition, the present invention provides a method of and means for improving the operation of condensers by providing a condenser having two portions, one being air cooled and the other being water cooled, both portions preferably receiving in parallel the heat depleted vapor exiting the turbine.

Finally, the present invention includes operation of such power plants in a transportation system based on electric powered vehicles, such as battery operated vehicles, in accordance with the invention disclosed in U.S. patent application Ser. No. (P9864), filed Feb. 19, 1991.

BRIEF DESCRIPTION OF DRAWINGS

Embodiments of the invention are shown in the accompanying drawings wherein:

FIG. 6 is a block diagram of another embodiment of the present invention.

DETAILED DESCRIPTION

Figure 1:
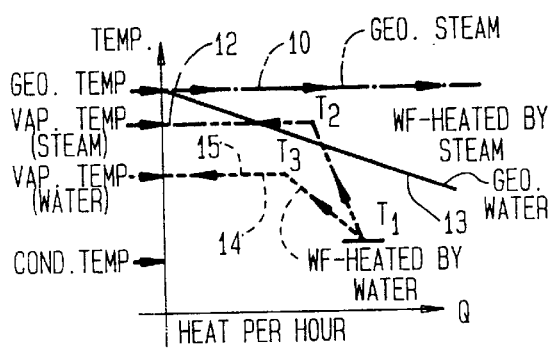
FIG. 1 is a plot of temperature versus heat input for a conventional arrangement in which geothermal steam and geothermal water are separately used in different power plants, in order to better understand the deficiencies of utilizing separate power plants for each phase of a two-phase, water dominated geothermal source.

Before discussing the details of the present invention, reference is made to FIG. 1 in order to further explain the problems associated with using separate Rankine cycle power plants for the geothermal water and for the geothermal steam produced by a two-phase, water dominated geothermal fluid source. Curve 10 represents, in an idealized manner, the time-wise variation in temperature of the geothermal steam component of the two-phase source as heat is transferred from the steam to a working fluid, e.g., an organic fluid, in a vaporizer containing working fluid at the temperature of the condenser. Except for the presence of non-condensable gases trapped in the steam, which adversely affects heat transfer, all of the heat transferred to the working fluid is derived from the latent heat in the steam whose temperature remains essentially constant.

Curve 11 represents the variation in the temperature of the working fluid as the latter is heated from its temperature entering the vaporizer (essentially the condenser temperature) designated by $T_1$ to the boiling point temperature $T_2$ of the working fluid. The area under curve 11 between the limits $T_1$ and $T_2$ represents the so-called pre-heat required to increase the sensible heat of the working fluid to its boiling point. The pre-heat is actually a considerable percentage of the the total heat supplied to the working fluid; and all of this heat is supplied by latent heat in the steam.

After the boiling point of the working fluid is reached, the latent heat of vaporization of the working fluid is supplied by the latent heat condensation of the steam as vaporization of the working fluid commences. The temperature of the working fluid remains constant during this phase as indicated by curve 12. During this phase, a greater amount of heat in the steam is transferred to the working fluid than during the pre-heat phase. Curves 10, 11, and 12 are thus representative of a Rankine cycle power plant operating on the steam component of a geothermal source as described in the '625 patent.

Curve 13 represents, in an idealized manner, the variation in temperature of the geothermal water component of the two-phase source as heat is transferred from the hot water to a working fluid, e.g., an organic fluid, in a vaporizer containing working fluid at the temperature of the condenser in a Rankine cycle power plant. All of the heat transferred from the water to the working fluid is sensible heat; and as a consequence, the water temperature drops as the temperature of the working fluid increases. In this case, the working fluid is preheated from temperature $T_1$ to $T_3$ (as shown by curve 14) by the water as the latter is cooled in the process. After the temperature of the working fluid reaches the boiling point, the temperature remains constant as indicated by curve 15. During this phase, the latent heat of vaporization of the working fluid is supplied by sensible heat in the water. Consequently, the maximum temperature available when the heat source is water will be less than that available when the source is steam. Curves 13, 14, and 15 are thus representative of a Rankine cycle power plant operating on the liquid water component of a geothermal source as disclosed in the '953 patent.

Considering that, in a steam-based power plant, the pre-heat portion of the operation is carried out very inefficiently from an energy standpoint, and that, in a water-based power plant, the boiling portion of the operation is carried out inefficiently, the result is that the overall operation of both power plants is not as efficient as possible. The present invention contemplates using both the steam and water components of the geothermal fluid in a single system. That is to say, the steam component is used under conditions that maximize the amount of heat extracted from the steam under optimum conditions of thermodynamic efficiency (i.e., the latent heat of vaporization of the working fluid during its boiling phase is supplied by latent heat in the steam component), and the water component is used under conditions that maximize the amount of heat extracted from the water under optimum efficiency conditions (i.e., sensible heat in the working fluid during its pre-heat phase is supplied by sensible heat in the water component).

Figure 3:
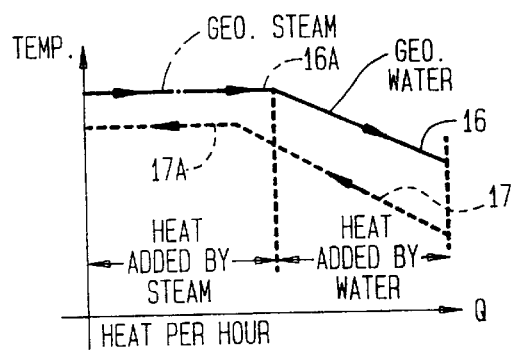
FIG. 3 is a plot of temperature versus heat input for the vaporizer/preheater arrangement shown in FIG. 2.

FIG. 3 illustrates apparatus that operates according to the present invention. Geothermal water is applied to the working fluid to preheat it resulting in a temperature variation as shown in curve 16. The resultant temperature variation in the working fluid is shown by curve 17. Note that the temperature of the water at the beginning of its heat transfer operation in the pre-heater of the power plant is the same as the temperature of the steam during its operation in the vaporizer. During the vaporization of the working fluid, the temperature of the steam remains substantially constant (except for the effect of the presence of non-condensable gases in the steam) as shown at 16A, and the temperature of the working fluid remains substantially constant as shown at 17A. Very little, if any, heat from the steam is used to preheat the working fluid.

Figure 2:
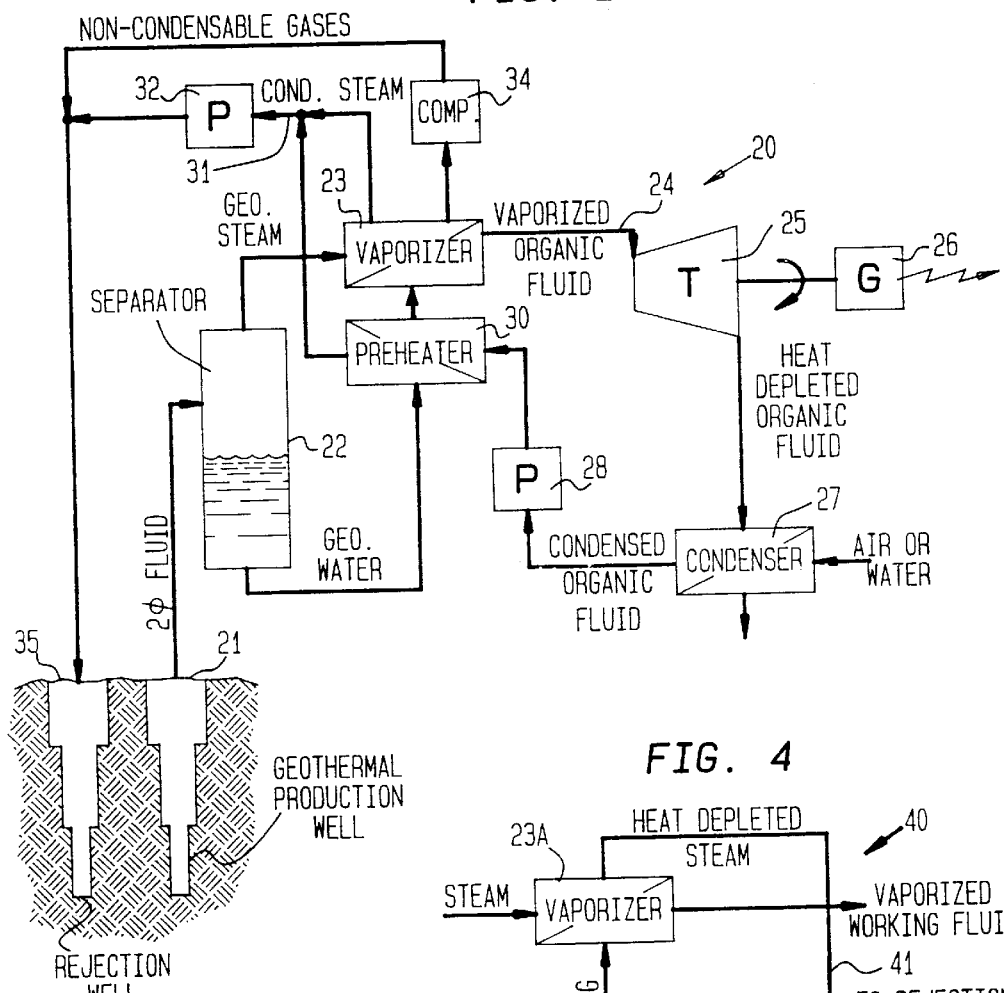
FIG. 2 is a block diagram of a power plant according to the present invention.

A power plant according to the present invention based on the above-described concept is designated by reference numeral 20 in FIG. 2 to which reference is now made. Power plant 20 is used in conjunction with geothermal production well 21 that produces a two-phase fluid such as water dominated geothermal fluid. The mixture of water and steam is applied to separator 22 where the steam is separated from the water, the steam being applied to vaporizer 23 containing a working fluid in the from of an organic fluid such as a Freon, hydrocarbon (e.g., pentane) or the like, and the water being applied to preheater 30.

Preheater 30, by reason of its operation described below, supplies working fluid to the vaporizer at close to the boiling point. In the vaporizer, the working fluid is vaporized, the latent heat of vaporization being furnished by the latent heat of condensation in the steam. Conduit 24 supplies vaporized working fluid to turbine 25 which is effective to convert some of the heat contained in the working fluid into useful work by the operation of generator 26 coupled to the turbine, and to produced heat-depleted working fluid that is applied to condenser 27. Heat contained in the heat-depleted working fluid is rejected into the air, when an air cooled condenser is involved, or into cooling water, when a water cooled condenser is involved; and vapor in the condenser is condensed into liquid working fluid condensate.

Pump 28 receives the condensate, at essentially the temperature and pressure of the condenser, and pressurizes it for return to the vaporizer via pre-heater 30. In the preheater, geothermal water extracted by separator 22 from the geothermal fluid is brought into heat exchange relationship with the working fluid. Sensible heat in the water is transferred to the working fluid as sensible heat thus preheating the working fluid as indicated by curves 16 and 17 of FIG. 3. Thus, each component of the two-phase fluid operates in its most efficient mode; and the thermal efficiency of the power plant is greatly improved over the situation in which separate steam and water power plants are used.

The geothermal water that exits from preheater 30, after giving up its sensible heat to the working fluid thus preheating it, is combined at 31 downstream of the vaporizer with condensate that exits vaporizer 23. Pump 32 pressurizes the liquid for re-injection into rejection well 34. Non-condensable gases in the vaporizer are vented therefrom, compressed at 34, and also delivered to the rejection line for injection into rejection well 34. A procedure like that shown in the '625 patent can be utilized.

Figure 4:
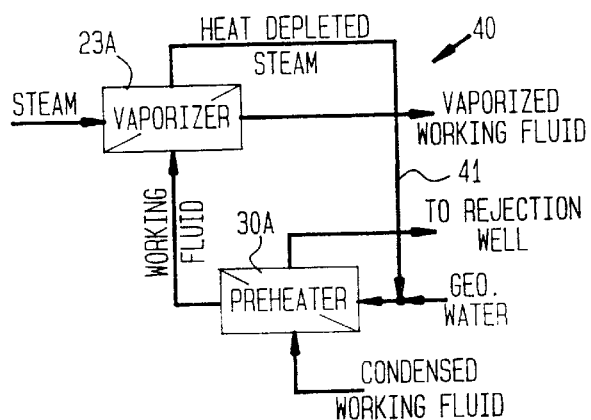
FIG. 4 is a modification of the vaporizer/preheater configuration shown in FIG. 2.

In a modification of the apparatus shown in FIG. 3, residual heat in the condensate exiting from the vaporizer is captured. Reference numeral 40 designates a modification of the construction of the vaporizer/preheater configuration shown in FIG. 3. Modification 40 comprises vaporizer 23A that receives steam from separator 22 and produces vaporized working fluid. I this modification, however, the heat depleted stream (condensate) exiting vaporizer 23A is mixed with the geothermal water exiting separator 22, and both are applied to preheater 30A. Consequently, working fluid in preheater 30A absorbs additional heat from the condensate exiting vaporizer 23A before the condensate is conveyed to the rejection well. FIG. 4 thus shows apparatus according to the present invention that includes means 41 for applying the heat depleted steam, or condensate, exhausted from the vaporizer to the preheater.

By mixing the steam condensate with the geothermal water or brine exiting separator 22 before applying the water to preheater 30A, more heat can be extracted from the geothermal brine. This is important because such geothermal water or brine often contains silica and/or other like materials which have a tendency to precipitate out when the temperature of these brines falls. Precipitation under these circumstances forms deposits on various components and/or piping which interferes with the heat transfer characteristics of such components and eventually causes their failure. In order to keep the silica in solution, the temperature of the brine is usually maintained at a fairly high exit temperature, e.g., about 120° C. By using condensate in accordance with the present invention to dilute the brine before it enters the preheater, the exit temperature of the can be lowered to a greater extent, e.g., to about 90° C., in the preheater in order to extract more heat without precipitation of silica or other such materials onto the walls of the preheater, or the piping, or other components.

Figure 4A:
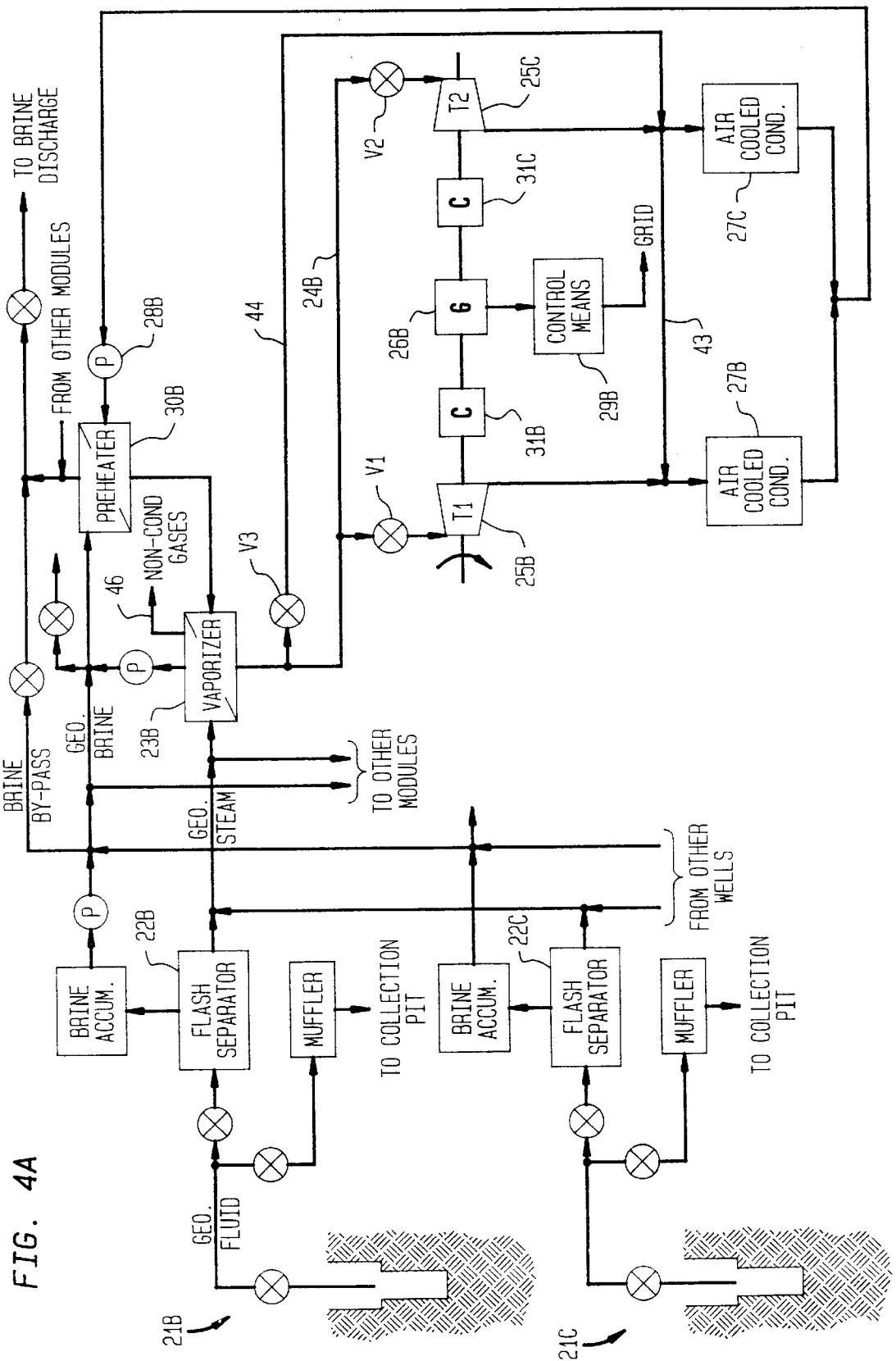
FIG. 4A is an implementation of the modification shown in FIG. 4.

An embodiment of a power plant using the modification shown in FIG. 4 is shown in FIG. 4A. In this embodiment, two geothermal production wells 21B and 21C are shown being used with two separators 22B and 22C rather than a single production well and a single separator as shown in FIG. 2. Actually, many production wells and many separators would be used in a single power plant system that would be modular in nature by using a plurality of production wells and separators.

Separator 22B separates the geothermal fluid drawn from production well 21B into a vapor and a liquid stream. The vapor stream contains separated geothermal steam which is piped to vaporizer 23B containing liquid organic fluid such as n-pentane. The steam gives up its heat to the organic working fluid which vaporizes, producing steam condensate that is pumped from the vaporizer and mixed with geothermal brine or water that constitutes the liquid stream produced by separator 22B. The resultant mixture flows into preheater 30B preheating liquid organic working fluid before the latter is piped to vaporizer 23B. The heat depleted mixture is discharged, preferably, into a re-injection well (not shown).

In the present embodiment, vaporized organic working fluid is applied in parallel, via piping 24B, to a pair of organic fluid turbines 25B and 25C which convert some of the heat contained in the working fluid to useful work via generator 26B coupled to the turbines through selectively operable couplings 31B and 31C. Heat depleted working fluid is exhausted from the turbines and applied to condensers 27B and 27C. Preferably, condensers 27B and 27C are air cooled so that the heat contained in the heat depleted working fluid is rejected into the ambient air by these condensers. As a result, the condensers produce liquid working fluid condensate. This condensate is returned to by pump 28B to vaporizer 30B to complete the working fluid cycle.

The use of a pair of organic turbines 25B and 25C coupled to generator 26B via couplings 31B and 31C, gives rise to improved flexibility in operation by permitting the output of the generator to be controlled in a simple manner. For example, the output of the generator is sensed by control means 29B which produces control signals that effect operation of valves V1 and V2 which throttle flow of vaporized working fluid into the inlets of turbines 25B and 25C. In this manner, the speed of the generator can be controlled thus controlling its electrical output.

Coupling 31B and 31C may include gears and clutches which are selectively and individually controllable to permit operation of the turbines, either separately or together. The gear portions of the couplings provide inertia that serves to dampen the reaction of the turbines to sudden changes in the electrical load. In addition, a pair of condensers is used in this embodiment to provide additional flexibility to the system.

Conduit 43 may be provided, if desired, to interconnect the exhaust lines of each of the turbines so that heat depleted working fluid will flow to both condensers even when only one or the other, or neither, of the two turbines is in operation. Conduit 44 may be provided to shunt both turbines thereby connecting vaporizer 23B directly to the condensers. This arrangement provides for the control of the pressure in the vaporizer, and also permits the power plant to remain on hot standby whereby the generator may be brought on line quickly when both turbines are idle. In a hot standby condition, the vaporized working fluid would bypass both turbines until the grid would call for power. When this occurs, valve V3 would be closed effecting entry of vaporized working fluid one or both turbines, as required, and generator 26B would be brought on line rapidly.

Vent conduit 46 connected to the steam side of vaporizer 23B is provided for venting non-condensable gases in the geothermal steam to the atmosphere. Alternatively, the non-condensables can be piped into a re-injection well (not shown) in a conventional manner. During this process, a small amount of steam, usually about 10% of the total steam passing through the vaporizer, is extracted as part of the venting operation.

Figure 5:
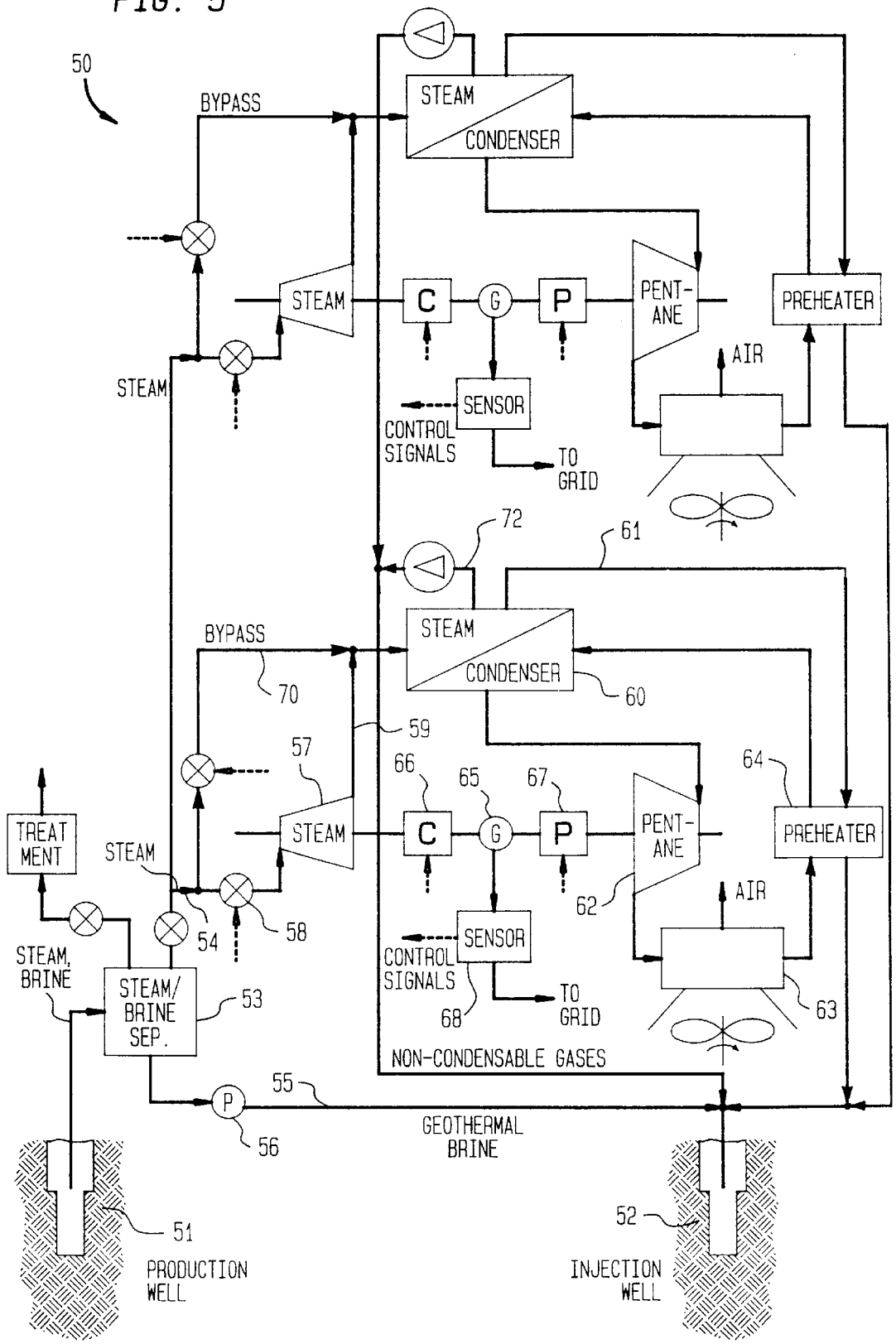
FIG. 5 is a block diagram of another embodiment of the present invention.

Another embodiment of the above mentioned control system is shown in FIG. 5 which depicts a geothermal power plant having two or more power plant modules similar to the power plant disclosed in the '565 application identified above. In the embodiment shown in FIG. 5, as well as in the apparatus disclosed in the '565 application, a single generator driven by a pair of turbines is utilized.

The operation of the power plant system shown in FIG. 5 is described in the '565 application. Briefly, geothermal power plant 50 includes production well 51 and injection well 52. The geothermal fluid produced by production well 51, comprising a mixture of steam and brine, is applied to steam/brine separator 53 which produces vapor stream 54 containing steam, and liquid stream 55 containing hot geothermal brine. Because this brine cools as it is piped to injection well 52, pump 56 may be utilized for the purpose of preventing minerals in this stream from precipitating before the brine reaches the injection well.

Power plant 50 is shown as comprising two modules, but this is for the purpose of illustration only, it being understood that many modules would be used in a complete power plant. Each module is identical so that only one module is described. As shown in FIG. 5, each module includes steam turbine 57 having throttle input 58 for receiving steam in stream 54. Turbine 57 operates in a conventional manner on the steam producing work and heat depleted steam in exhaust line 59. Steam condenser 60 is provided for the purpose of cooling heat depleted steam in line 59 and producing condensate which flows in condensate line 61 to injection well 52. A pump (not shown) may be provided for pressurizing the condensate sufficiently to force the same into the injection well. Prior to injection of the condensate into the well, the condensate is combined with the geothermal brine and serves to reduce the concentration of the brine and further inhibit precipitation in the piping leading to the injection well.

Condenser 60 is cooled with an organic fluid, such as pentane, which is vaporized in condenser 60 and is applied to organic fluid turbine 62, where the vapor expands and produces work and heat depleted organic vapor which is applied to condenser 63. Preferably, condenser 63 is an air cooled condenser which condenses the heat depleted organic vapor and supplies the condensate to steam condenser 60.

The steam turbine and organic turbine are contained in power plant modules as shown in FIG. 5. A single generator, indicated by reference numeral 65, is provided. Generator 65 is coupled via selectively operable couplings 66 and 67 to steam turbine 57 and organic vapor 62, respectively. These clutches are individually operable, either manually, to automatically for the purpose of selectively connecting either or both of the turbines to generator 65.

The output of the generator is applied to an electrical grid through sensor 68 which is effective to monitor the load on the generator. Sensor 68 is effective to control throttle input 58 of steam turbine 57 in accordance with the electrical load.

Power plant 50 further includes bypass means 30 in the form of suitable piping that permits throttle input 58 and turbine 57 to be bypassed when valve 71 is opened and throttle input 58 is closed. In this manner, steam in the vapor stream can be applied directly to condenser 60 during periods of relatively low load or maintenance of turbine 57. This arrangement ensures continuous operation of production well 51.

Finally, non-condensable gases in the steam exhausted by turbine 57 are vented from condenser 60 at 32. These gases may be compressed and piped to injection well 52.

The thermal efficiency of a power plant is increased by employing heat exchanger 64 between the pentane condensate produced by condenser 63 and the steam condensate directed to re-injection well 52.

While the above description deals with a specific type of two-phase fluid, namely fluids derived from a water dominated geothermal source, the invention is also applicable to other types of two-phase fluids in which one phase is a hot condensable gas containing latent heat, and the other phase is a hot liquid. Furthermore, the above-described invention is also applicable to situations where separate sources of hot steam and hot liquid or water are available.

In order to further increase the thermodynamic efficiency of the above-described power plants, or to increase the efficiency of a single turbine, the condenser therefor may be provided with an air cooled portion and a water cooled portion for condensing the heat depleted working fluid that is exhausted from the turbine. A condenser according to the present is shown as a part of power plant 80 in FIG. 6 to which reference is now made. Geothermal fluid, such as brine, is extracted from well 81 and applied to vaporizer 90 containing liquid organic working fluid, such as isopentane, or n-pentane. The working fluid is vaporized in the vaporizer, and the heat depleted brine is rejected into re-injection well 82. The vaporized working fluid is applied to turbine 92 where some of the heat is converted into work via generator 93, and the heat depleted vaporized working fluid exhausted from the turbine is applied, in parallel, to air cooled portion 94A of condenser 94 and water cooled portion 94B. Cooling tower 96, and/or spray cooling pond 96A are operatively associated with water cooled condenser 94B in a conventional manner. After the heat depleted vaporized working fluid is condensed into a liquid condensate in condenser 94, the condensate is pumped from the condenser into vaporizer 90 by cycle pump 98 to complete the working fluid cycle.

Both condenser portions are designed to operate continuously all year, summer and winter. In the winter, the operation of the water cooled portion will be hindered when ambient temperature drops below the freezing point and the cooling water freezes. In such case, most of the cooling will be effected by the air cooled portion of the condenser, and the sink temperature of the condenser will thus be below freezing.

In the summer, the operation of the air cooled portion will be hindered when the ambient temperature rises. In such case, most of the cooling will be effected in the water cooled portion of the condenser. In particular, when the climate is relatively dry and the temperature is relatively high, the cooling tower will cool the water to a temperature below the dry bulb temperature of the ambient air, and specifically, to a temperature that approaches the wet bulb temperature of the air. The sink temperature of the condenser will thus be lower than ambient air (dry bulb) temperature.

As a result of the design of condenser 94, the control of the flow of vaporized working fluid in the condenser will be natural or automatic eliminating the need for any external controls. Moreover, the flow of vaporized working fluid will be proportional to the cooling capacity of each portion of the condenser under all practical ambient temperature conditions.

Finally, in a further embodiment of the present invention, any of the above-described power plants, are particularly well suited for use in an isolated geographic location, such as an island, having diurnal periods of peak power consumption, usually during the day, and off peak power consumption, usually during the night. Power generated during usual off peak time can be used for charging batteries for battery operated vehicles which are usually used during peak power time. The operation of this embodiment is in accordance with the invention disclosed in the (P9853) application identified above.

The advantages and improved results furnished by the method and apparatus of the present invention are apparent from the foregoing description of the preferred embodiment of the invention. Various changes and modifications may be made without departing form the scope of the invention as described in the appended claims.

We claim:

1. A power plant comprising:
   a) a separator for separating a two-phase geothermal fluid into a vapor stream containing steam, and a liquid stream containing hot brine;
   b) a steam turbine associated with a generator and responsive to said steam for driving the generator and producing power and expanded steam;
   c) a steam condenser containing an organic fluid for condensing said expanded steam and producing steam condensate and vaporized organic fluid;
   d) an organic vapor turbine associated with a generator for driving the generator and producing power and expanded organic vapor;
   e) an organic fluid condenser for condensing said expanded organic vapor and returning the resulting condensate to said steam condenser;
   f) a preheater interposed between the organic condenser and said steam condenser for preheating said resulting condensate before it is returned to said steam condenser; and
   g) means for applying said steam condensate to said preheater for preheating said resulting condensate before it is returned to said steam condenser.

2. A power plant according to claim 1 wherein the same generator is associated with said steam turbine and said organic vapor turbine.

3. A power plant according to claim 1 wherein said steam turbine and its associated generator are connected through a selectively operable coupling, said organic vapor turbine and its associated generator are connected through a selectively operable coupling, and means are provided for generating control signals that selectively operate said each coupling.

4. A power plant according to claim 3 wherein the same generator is associated with said steam turbine and said organic vapor turbine.

5. A power plant comprising:
   a) a separator for separating a two-phase geothermal fluid into a vapor stream containing steam, and a liquid stream containing hot brine; and
   b) a plurality of modules to which said steam is applied in parallel for generating power, each module having:
      1) a steam turbine associated with a generator and responsive to applied steam for driving the generator and producing power and expanded steam; and
      2) a steam condenser containing an organic fluid for condensing said expanded steam and producing steam condensate and vaporized organic fluid;
      3) an organic vapor turbine associated with a generator for driving the generator and producing power and expanded organic vapor;
      4) an organic fluid condenser for condensing said expanded organic vapor and returning the resulting condensate to said steam condenser;
      5) a preheater interposed between the organic condenser and said steam condenser for preheating said resulting condensate before it is returned to said steam condenser; and
      6) means for applying said steam condensate to said preheater for preheating said resulting condensate before it is returned to said steam condenser and for producing cooled steam condensate.

6. A power plant according to claim 5 including means for combining said hot brine with cooled steam condensate from each module to produce a combined stream, and means for disposing of said combined stream in a re-injection well.

7. A power plant according to claim 5 including means associated with each module for separating non-condensable gases in the steam applied to the module, means for collecting separated non-condensable gases from each module, and means for disposing of collected separated non-condensable gases in said re-injection well.

* * * * *

UNITED STATES PATENT AND TRADEMARK OFFICE
CERTIFICATE OF CORRECTION

PATENT NO. : 5,839,282
DATED : November 24, 1998
INVENTOR(S) : Bronicki et al.

Page 1 of 1

It is certified that error appears in the above-identified patent and that said Letters Patent is hereby corrected as shown below:

Title page,
Item [73], Assignee name, delete "Ormai" and insert -- Ormat --.

Signed and Sealed this

Twenty-fifth Day of December, 2001

Attest:

JAMES E. ROGAN
*Attesting Officer*  *Director of the United States Patent and Trademark Office*